(12) United States Patent
Petrescu et al.

(10) Patent No.: US 9,659,355 B1
(45) Date of Patent: May 23, 2017

(54) APPLYING CORRECTIONS TO REGIONS OF INTEREST IN IMAGE DATA

(71) Applicant: Motorola Mobility LLC, Chicago, IL (US)

(72) Inventors: Doina I Petrescu, Vernon Hills, IL (US); Thomas Lay, Highland Park, IL (US); Bill Ryan, Libertyville, IL (US); Jeffrey S Vanhoof, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/957,654

(22) Filed: Dec. 3, 2015

(51) Int. Cl.
*G06K 9/00* (2006.01)
*G06T 5/00* (2006.01)
*G06K 9/20* (2006.01)
*G06T 7/40* (2017.01)
*G06T 7/00* (2017.01)
*H04N 9/64* (2006.01)

(52) U.S. Cl.
CPC .......... *G06T 5/005* (2013.01); *G06K 9/00248* (2013.01); *G06K 9/2054* (2013.01); *G06T 7/0042* (2013.01); *G06T 7/408* (2013.01); *H04N 9/646* (2013.01); *G06T 2207/10024* (2013.01); *G06T 2207/30201* (2013.01); *G06T 2207/30216* (2013.01)

(58) Field of Classification Search
CPC ........ H04N 1/624; H04N 1/6086; H04N 1/62; H04N 5/217; H04N 5/2354; H04N 5/357; G06T 5/005; G06T 7/408; G06T 2207/30216; G06T 2207/10024; G06T 2207/30201; G06K 9/0061; G06K 9/4652
USPC ......................................... 382/167, 274–275
See application file for complete search history.

(56) References Cited

U.S. PATENT DOCUMENTS

| 7,738,015 | B2 * | 6/2010 | Steinberg | G06K 9/00248 348/223.1 |
| 8,837,822 | B2 * | 9/2014 | Zimmer | G06F 3/041 345/600 |
| 8,957,993 | B2 * | 2/2015 | DeLuca | H04N 5/217 348/221.1 |
| 9,167,164 | B2 * | 10/2015 | Baek | G11B 27/3027 |
| 9,225,904 | B2 * | 12/2015 | Furuya | H04N 1/212 |

* cited by examiner

*Primary Examiner* — Kanjibhai Patel
(74) *Attorney, Agent, or Firm* — Yudell Isidore PLLC

(57) ABSTRACT

A method, a system, and computer program product for correcting image artifacts in image data captured by a camera sensor in conjunction with a flash. The method includes extracting, from a buffer, an image data captured by at least one camera sensor. The method then includes determining, from a metadata of the image data, a face in the image data and a position of a first eye and a second eye. The method then includes selecting at least one region of interest around at least one of the first and the second eye based on a size of the face and a distance between the eyes. In response to selecting the at least one region of interest, at least one correction is applied to the at least one region of interest to reduce or eliminate the appearance of at least one image artifact in the image data.

20 Claims, 6 Drawing Sheets

APPLYING CORRECTIONS TO REGIONS OF INTEREST IN IMAGE DATA

BACKGROUND

1. Technical Field

The present disclosure generally relates to image processing systems and in particular to an improved method for automatically correcting image artifacts in image data captured in conjunction with a flash.

2. Description of the Related Art

When a camera sensor is used to capture image data in conjunction with a flash, undesirable artifacts are sometimes visible in the captured image data. Bright-eye artifacts and red-eye artifacts, caused by a cornea reflection and blood vessels in the eye, are frequently the cause of the undesirable artifacts. These artifacts reduce the overall quality of the image data and may cause a subject to be misrepresented within the image data. These artifacts may also be significantly distracting to a viewer of the image data.

Software solutions currently exist to correct red-eye artifacts in still images. However, many of these solutions involve post-processing an image in storage, and are performed only by a special photo editing software. Additionally, current solutions are not automatically applied to an image data when the image data is captured. Additionally, many of these solutions require the image data be converted to a specific color space, such as red green blue (RGB) color space or hue, saturation, and value (HSV) color space, before applying corrections to the image data.

DETAILED DESCRIPTION

Figure 1:
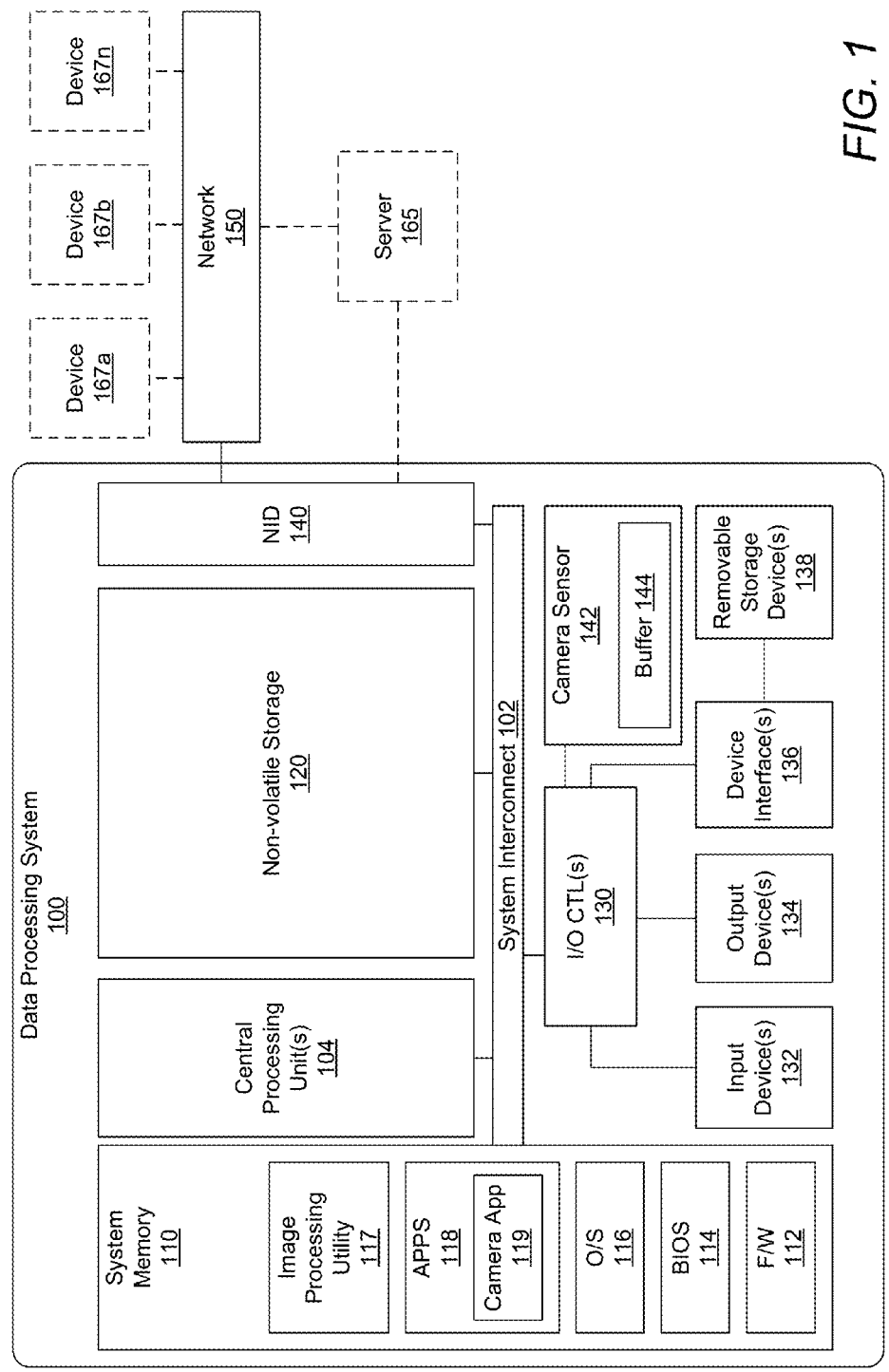
FIG. 1 provides a block diagram representation of an example system within which certain aspects of the disclosure can be practiced, in accordance with one or more embodiments.

The illustrative embodiments provide a method, a system, and a computer program product for correcting image artifacts in image data captured by a camera sensor in conjunction with a flash. The method includes extracting, from a buffer, an image data captured by at least one camera sensor. The method then includes determining, from metadata of the image data, a face in the image data and a position of a first eye and a second eye. At least one region of interest around at least one of the first eye and the second eye is then selected based on a size of the face and a distance between the eyes. In response to selecting the at least one region of interest, at least one correction is applied to the at least one region of interest to reduce or eliminate the appearance of at least one image artifact in the image data.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following description.

In the following detailed description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

As utilized herein, image data refers to image data captured by one or more camera sensors in conjunction with a flash. The image data may be captured by a single camera sensor or multiple camera sensors working independently and/or in tandem. The image data may be in any format including, but not limited to a raw image data format. The image data may comprise multiple image frames such as a video recording, a burst image, a set of images, or any suitable combination of the foregoing.

As utilized herein, an image artifact refers to a visible object in an ocular region (e.g., an eye) of a subject within a captured image data that is consistent with one of a bright or white area (commonly referred to as a ghost-eye/white-eye/bright-eye artifact) and a red area (e.g., a red-eye effect).

Those of ordinary skill in the art will appreciate that the hardware components and basic configuration depicted in the following figures may vary. For example, the illustrative components within data processing system 100 are not intended to be exhaustive, but rather are representative to highlight components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any personal device such as a desktop computer, notebook computer, mobile phone, tablet, or any other electronic device that supports image capturing. Data processing system 100 includes at least one central processing unit (CPU) or processor 104 coupled to system memory 110 via system interconnect 102. System interconnect 102 can be interchangeably referred to as a system bus, in one or more embodiments. These one or more software and/or firmware modules can be loaded into system memory 110 during operation of DPS 100. Specifically, in one embodiment, system memory 110 can include therein a plurality of such modules, including one or more of firmware (F/W) 112, basic input/output system (BIOS) 114, operating system (OS) 116, image processing utility (IPU) 117, and application(s) 118. In one embodiment, applications 118 may include camera application 119. These software and/or firmware modules have varying functionality when their corresponding program code is executed by CPU 104 or by secondary processing devices within data processing system 100.

IPU 117 is a utility that executes within DPS 100 to provide logic that performs the various methods and functions described herein. For simplicity, IPU 117 is illustrated and described as a stand-alone or separate software/firmware/logic component, which provides the specific functions and methods described below. However, in at least one embodiment, IPU 117 may be a component of, may be combined with, or may be incorporated within firmware of DPS 100, or within the OS 116, and/or one or more of applications 118, such as a camera (or image capture device) application 119.

Data processing system 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. Also coupled to I/O controllers 130 is camera sensor 142 which is usable to capture image data. Any image data captured by camera sensor 142 is located within buffer 144 until processed and/or compressed and stored to a memory such as non-volatile storage 120 and system memory 110. While buffer 144 is illustrated within camera sensor 142, buffer 144 may also be a separate component that is coupled to camera sensor 142 and/or may be an allocated portion of a memory of DPS 100 (e.g., system memory 110). In yet another embodiment, buffer 144 is a Zero Shutter Lag (ZSL) buffer that instantaneously stores image data captured by camera sensor 142 at the moment a shutter (not pictured) of camera sensor 142 captures the image data.

I/O controllers 130 also support connection with and forwarding of output signals to one or more connected output devices 134, such as monitors, a camera flash, and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as I²C, SMBus, and peripheral component interconnect (PCI) buses.

Data processing system 100 comprises a network interface device (NID) 140. NID 140 enables DPS 100 and/or components within DPS 100 to communicate and/or interface with other devices, services, and components that are located external to DPS 100. In one embodiment, DPS 100 may directly connect to one or more of these external devices, such as server 165 and devices 167a-n, via NID 140. These devices, services, and components can also interface with DPS 100 via an external network, such as example network 150, using one or more communication protocols. Network 150 can be a local area network, wide area network, personal area network, and the like, and the connection to and/or between network and DPS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

Figure 2:
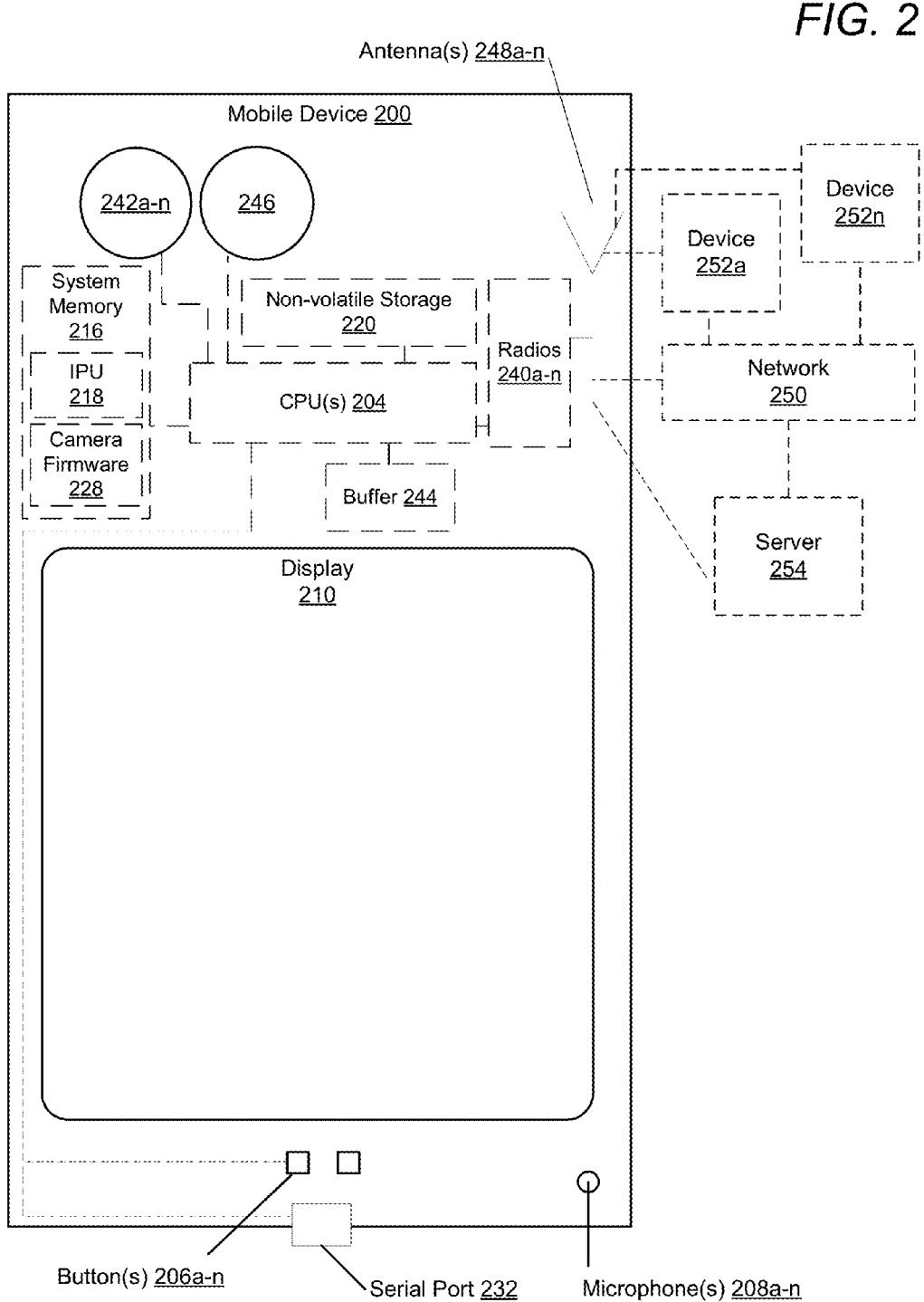
FIG. 2 illustrates a mobile device within which certain aspects of the disclosure can be practiced, in accordance with one or more embodiments.

FIG. 2 illustrates an example mobile device 200 within which one or more of the described features of the various embodiments of the disclosure can be implemented. Mobile device 200 includes a central processing unit (CPU) or processor 204. Processor 204 is coupled to system memory 216 and/or non-volatile storage 220, within which program code for camera (or image capture device) firmware 228 and IPU 218 can be stored for execution on processor 204. IPU 117 executes within mobile device 200 to provide logic that performs the various methods and functions described herein. As shown, mobile device 200 comprises several input devices and output devices for interacting with a user. In the illustrated embodiment, mobile device 200 includes camera sensors 242a-n, camera flash(es) 246, hardware buttons 206a-n, and microphones 208a-n. Camera flash(es) 246 may be used in conjunction with camera sensors 242a-n in order to capture image data. Microphones 208a-n are used to receive spoken input/commands from a user. Hardware buttons 206a-n are selectable buttons which are used to receive manual/tactile input from a user to control specific operations of mobile device and/or of device applications. In one embodiment, hardware buttons 206a-n may also include or be connected to one or more sensors (e.g. a fingerprint scanner) and/or be pressure sensitive. Hardware buttons 206a-n may also be directly associated with one or more functions of the GUI and/or functions of an OS, application, or hardware of mobile device 200. In one embodiment, hardware buttons 206a-n may include a keyboard. CPU 204 and/or camera sensors 242a-n may also optionally be connected with a buffer 244 for storing image data captured by camera sensors 242a-n.

Mobile device 200 also includes serial port 232 (e.g. a micro-USB (universal serial bus) port) that allows a direct physical connection to and communication of data with a second device. In one embodiment, serial port 232 may also connect to a power charger (not pictured) for charging a battery (not pictured) of mobile device 200. Mobile device 200 also includes a display 210 that is capable of displaying a graphical user interface (GUI) of firmware and/or one or more applications executing on mobile device 200. In one embodiment, display 210 is a touch screen that is also capable of receiving touch input from a user of mobile device 200 interacting with a displayed GUI. A GUI displayed by mobile device 200 on display 210 may be rendered by CPU 204. Mobile device 200 also includes one or more wireless radios 240a-n and one or more antenna(s) 248a-n that enable mobile device 200 to wirelessly connect to, and transmit and receive data (including image data and metadata) with one or more other devices, such as devices 252a-n and server 254. As a wireless device, mobile device 200 can transmit the data over a wireless network 250 (e.g., a Wi-Fi network, cellular network, or personal area network).

Figure 3:
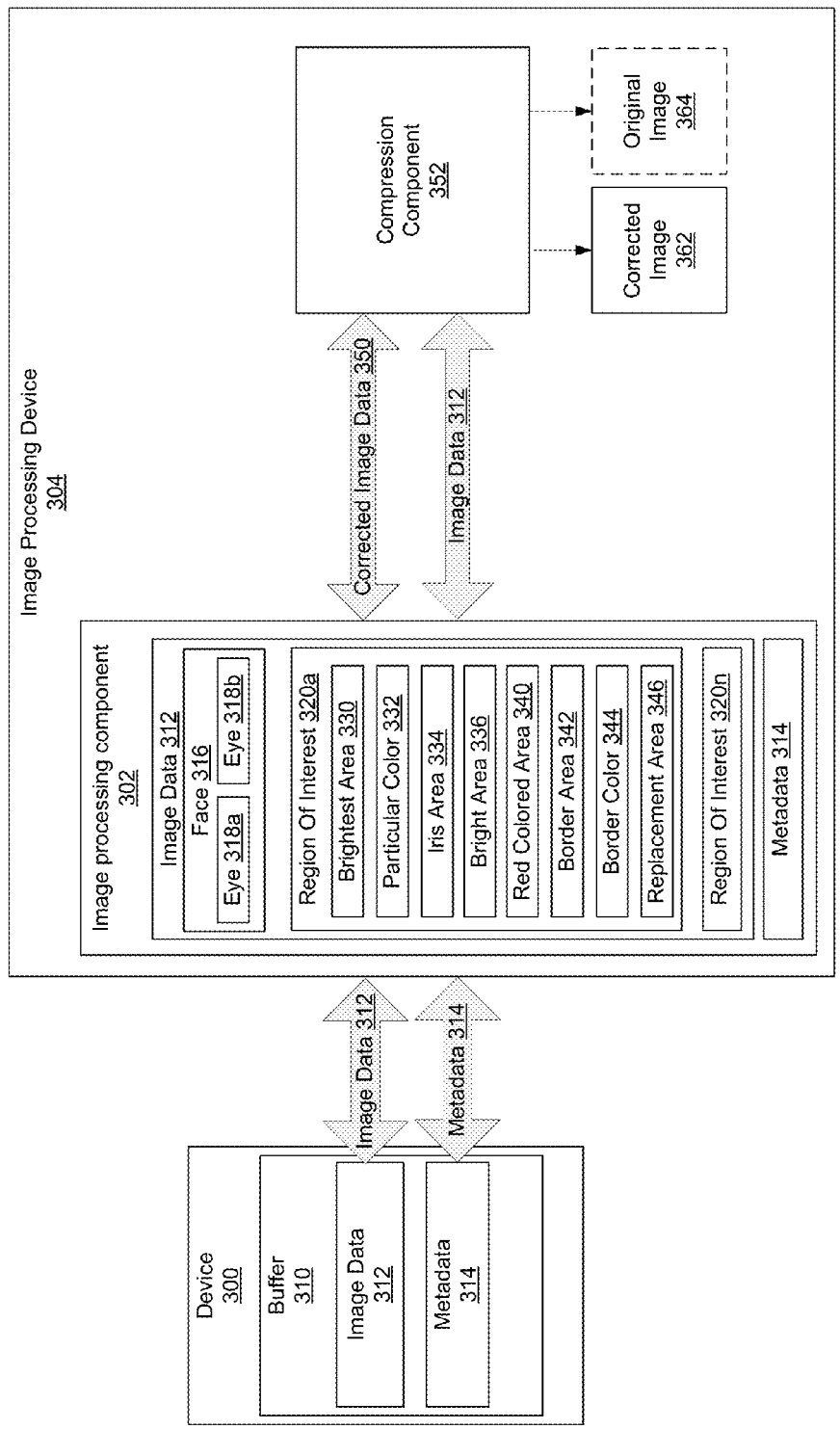
FIG. 3 illustrates an example image processing component that corrects image artifacts in image data captured by a camera sensor, in accordance with one or more embodiments.

FIG. 3 illustrates an example image processing component (IPC) 302 of image processing device 304 that corrects image artifacts in image data captured by a camera sensor of device 300, in accordance with one or more embodiments. IPC 302 includes a processor that executes IPU 117. In one embodiment, image processing device 304 may be a processing server that (1) receives image data 312 captured by a camera sensor of device 300 (which may be a mobile device, such as mobile device 200), (2) automatically corrects image artifacts in the received image data 312, and (3) stores the corrected image data to a local and/or remote image library and/or returns the corrected image data to device 300. In another embodiment, the functionality associated with image processing device 304 is incorporated within the device that captures the image, device 300. In this embodiment, device 300 provides a single device that captures the image, automatically corrects image artifacts, and stores the corrected image data (e.g., mobile device 200). The single device is thus configured to capture image data 312 via a camera sensor (e.g., camera sensor 142) and automatically correct, in real-time, image artifacts in image data 312 as image data 312 is captured to buffer 310. In yet another embodiment, device 300 may also automatically correct the image artifacts in image data 312 in response to the image data being captured and/or stored in buffer 310 and in response to camera sensor 142 and/or a camera software (e.g., camera application 119) being currently configured in a particular mode (e.g., flash on, auto mode, image correction mode).

Buffer 310 is a first part of a color image processing pipeline before compression to an image format, such as Joint Photographic Experts Group (JPEG) compression format. Image data 312 is data in a particular color space (e.g., YcbCr image data). Since the corrections are applied to image data 312 in buffer 310, IPC 302 is able to correct image artifacts in image data 312 before any color space conversion and compression is applied to image data 312.

IPC 302 extracts image data 312 and metadata 314 from buffer 310. Metadata 314 includes information regarding the size and shape of one or more faces 316 in image data 312 and information identifying a location and center position of eyes 318a-b on the one or more faces 316. Using metadata 314, IPC 312 determines at least one region of interest 320a-n. Each region of interest 320a-n is based around a center and/or an iris of the eye 318. IPC 302 determines the size of each region of interest 320a-n based on the size of a corresponding face 316 and a distance between eyes 318a-b, if two eyes of the same subject are visible in image data 312. The size of the face 316 and the distance between the eyes 318a-b may be measured in the image data. Alternatively, a ratio between the size of the face 316 and the distance between eyes 318a-b may be used to identify regions of interest 320a-n.

IPC 302 determines a location of brightest area 330 from within each region of interest 320a-n of image data 312. IPC 302 determines the location of brightest area 330 within a region of interest 320a by imposing a circularity constraint. Other identified bright pixels that are not bound by the circularity constraint are considered irrelevant and are discarded. Once the location of brightest area 330 within region of interest 320a is determined, brightest area 330 is then extracted from the image data. IPC 302 also determines a location of particular color 332 within a colored area that surrounds brightest area 330. In one embodiment, the identification of a region of interest 320 is based on IPC 302 identifying brightest area 330 within an eye of a subject.

In one embodiment, IPC 302 may then replace brightest area 330 within a region of interest 320a with iris area 334 that is colored by IPC 302 using particular color 332. After replacing brightest area 330 with iris area 334, IPC 302 may construct a white-colored bright area 336 within iris area 334. IPC 302 applies a brightness to bright area 336 that is equivalent to a same brightness associated with brightest area 330. In another embodiment, IPC 302 may determine whether particular color 332 is one of a plurality of natural iris colors. In response to determining particular color 332 is not one of a plurality of natural iris colors, image processing device 304 may determine that an error has occurred and may cancel corrections to image data 312.

In another embodiment, in response to identifying brightest area 330 in a region of interest 320*a*, IPC 302 may then determine whether there exists a red colored area 340 that surrounds brightest area 330, based on a color range associated with a color space of the image data 312 (e.g., a YcbCr color space). In response to identifying red colored area 340 for the region of interest 320*a*, IPC 302 determines a border area 342 that is adjacent to red colored area 340. Once the target area is identified, IPC 302 identifies border color 344, which is the color of border area 342. Red colored area 340 is then extracted from the region of interest 320*a*. IPC 302 then constructs replacement area 346 that replaces red colored area 340. IPC 302 colors replacement area 346 using border color 344 and progressively darkens replacement area 346 from an outside boundary of replacement area 346 towards the center of replacement area 346 to recreate an iris within an "eye" at region of interest 320.

In one embodiment, IPC 302 may reconstruct bright area 336 in replacement area 346. Bright area 336 represents a glint in the eye which gives the eye a natural appearance when image data 312 is viewed by a user. In response to reconstructing bright area 336, IPC 302 applies a brightness to bright area 336 that is the equivalent to a same brightness that is associated with brightest area 330. In one embodiment, bright area 336 is reconstructed in the center of replacement area 346. In another embodiment, the position of bright area 336 within replacement area 346 is based on a determined tilt/angle of the eye and/or face and/or a determined direction that the subject is facing. The size of bright area may be based on a size of the eye, the size of region of interest 320, and/or the size of replacement area 346. In one embodiment, the shape of bright area 336 is circular. In another embodiment the shape of bright area 336 is based on the size and/or shape of the eye, region of interest 320, replacement area 346, a determined a tilt/angle of the eye and/or face, and/or a determined direction that the subject is facing.

In yet another embodiment, IPC 302 evaluates a size of brightest area 330 relative to a distance between two eyes of a same subject in image data 312. IPC 302 then determines from the evaluation whether the size of brightest area 330 is greater than a pre-established size threshold that is associated with the distance between the two eyes. A brightest area 330 that is greater than the pre-established size threshold indicates the presence of a white-eye/ghost-eye image artifact. If the size of brightest area 330 is greater than the pre-established size threshold, IPC 302 reduces the size of brightest area 330 from an outside boundary towards the center of brightest area 330. This reduction in size of brightest area 330 gives brightest area 330 the appearance of a natural glint in the eye when image data 312 is viewed by a user. In another embodiment, IPC 302 may darken a brightness of all or a portion of brightest area 330 and/or replace a portion of brightest area with border color 344. The size that the brightest area is reduced to may be based on a size of the eye, a size of region of interest 320, and/or the distance between the eyes. In another embodiment, the size that the brightest area is reduced to may be based on a pre-determined size. In yet another embodiment, IPC 302 may evaluate the size of brightest area 330 in response to being unable to identify a red colored area 340 for a particular region of interest 320.

Any image data that is corrected by IPC 302, as described above, may optionally be transferred as corrected image data 350 to compression component 352. In one embodiment, compression component 352 is a compression encoder. Compression component 352 compresses corrected image data 350 using a compression format (e.g., JPEG compression format) to create corrected image 362. In another embodiment, IPC 302 may directly store corrected image 362 within a local memory (e.g. non-volatile storage 120) and/or may transmit corrected image 362 to another device for storage.

In another embodiment, compression component 352 of IPC 302 may also compress an unmodified copy of image data 312 to create original image 364. IPC 302 may directly store original image 364 within a local memory (e.g. non-volatile storage 120) and/or may transmit the original image 364 to another device for storage. Original image 364 may also be associated with corrected image 362 such as by linking original image 364 and corrected image 362 and/or by using a similar naming convention to name both original image 364 and corrected image 362. In another embodiment, IPC 302 may also store an unmodified copy of image data 312 as original image 364.

One or more of the embodiments described above may further be combined in any order to correct multiple types of image artifacts, such as a red-eye artifact and a ghost-eye artifact, in image data 312. For example, IPC 302 may first correct red colored area 340 before correcting brightest area 330 and reconstructing bright area 336. In still another embodiment, one or more of the embodiments described above may be performed as part of a framework associated with camera sensor 142 and/or an operating system associated with IPC 302.

Figure 4:
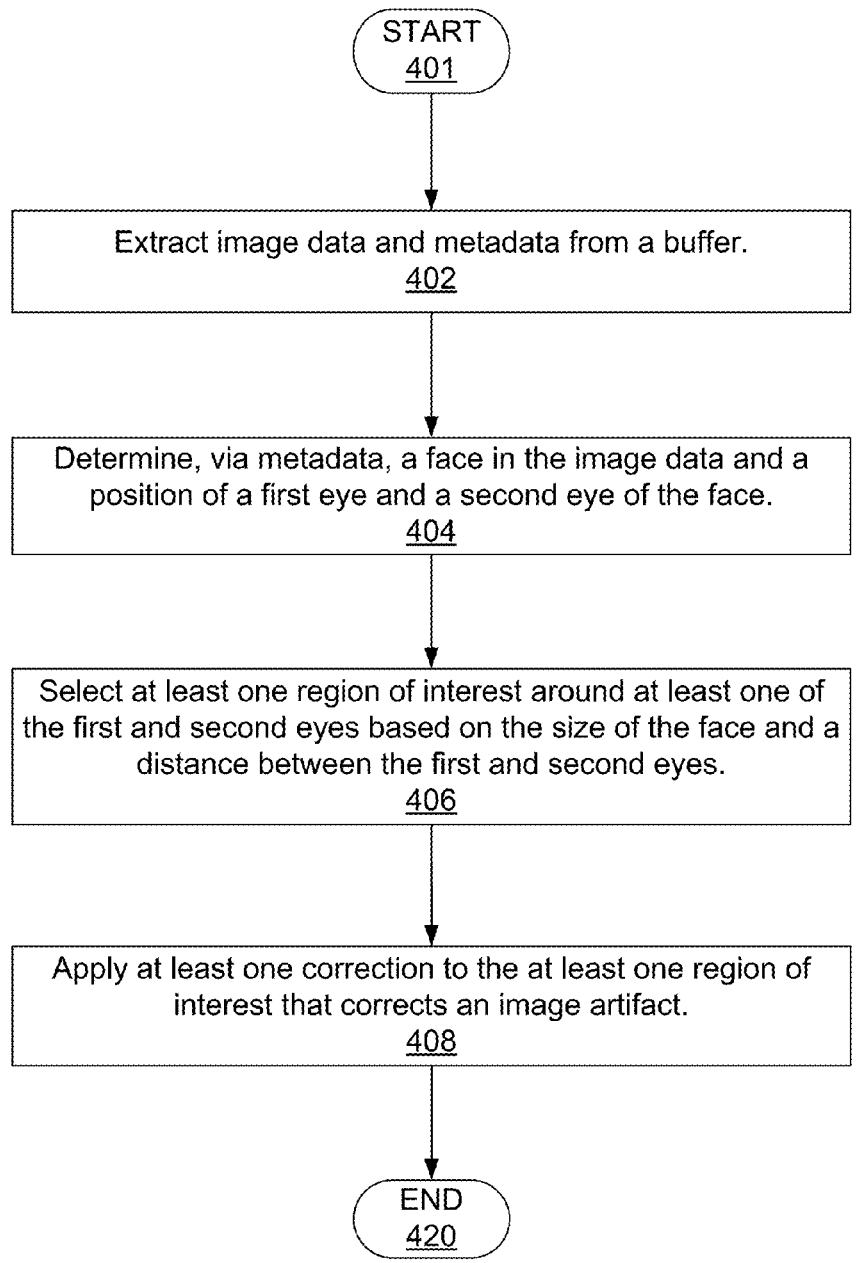
FIG. 4 is a flow chart illustrating a method for correcting image artifacts within at least one region of interest of an image data, in accordance with one or more embodiments.
Figure 5:
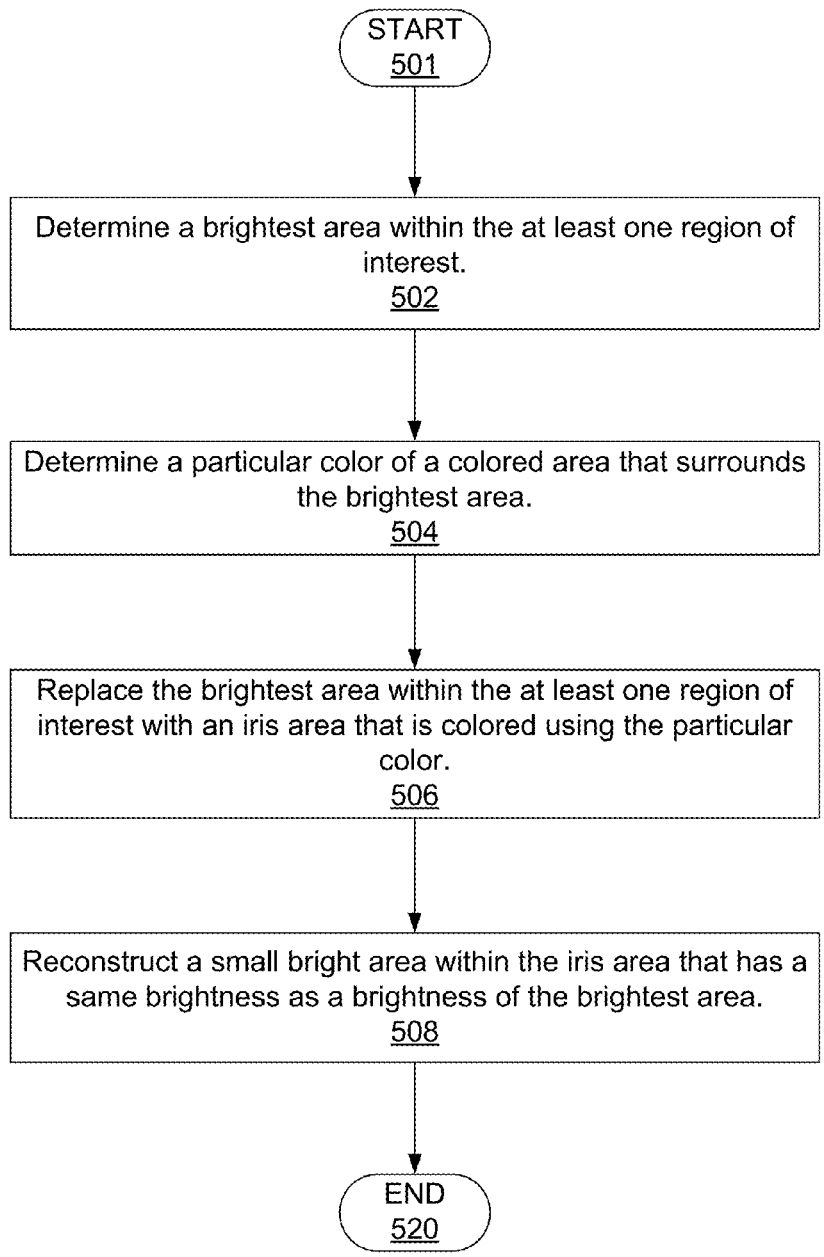
FIG. 5 is a flow chart illustrating a method for correcting an iris color within at least one region of interest of an image data, in accordance with one or more embodiments.
Figure 6:
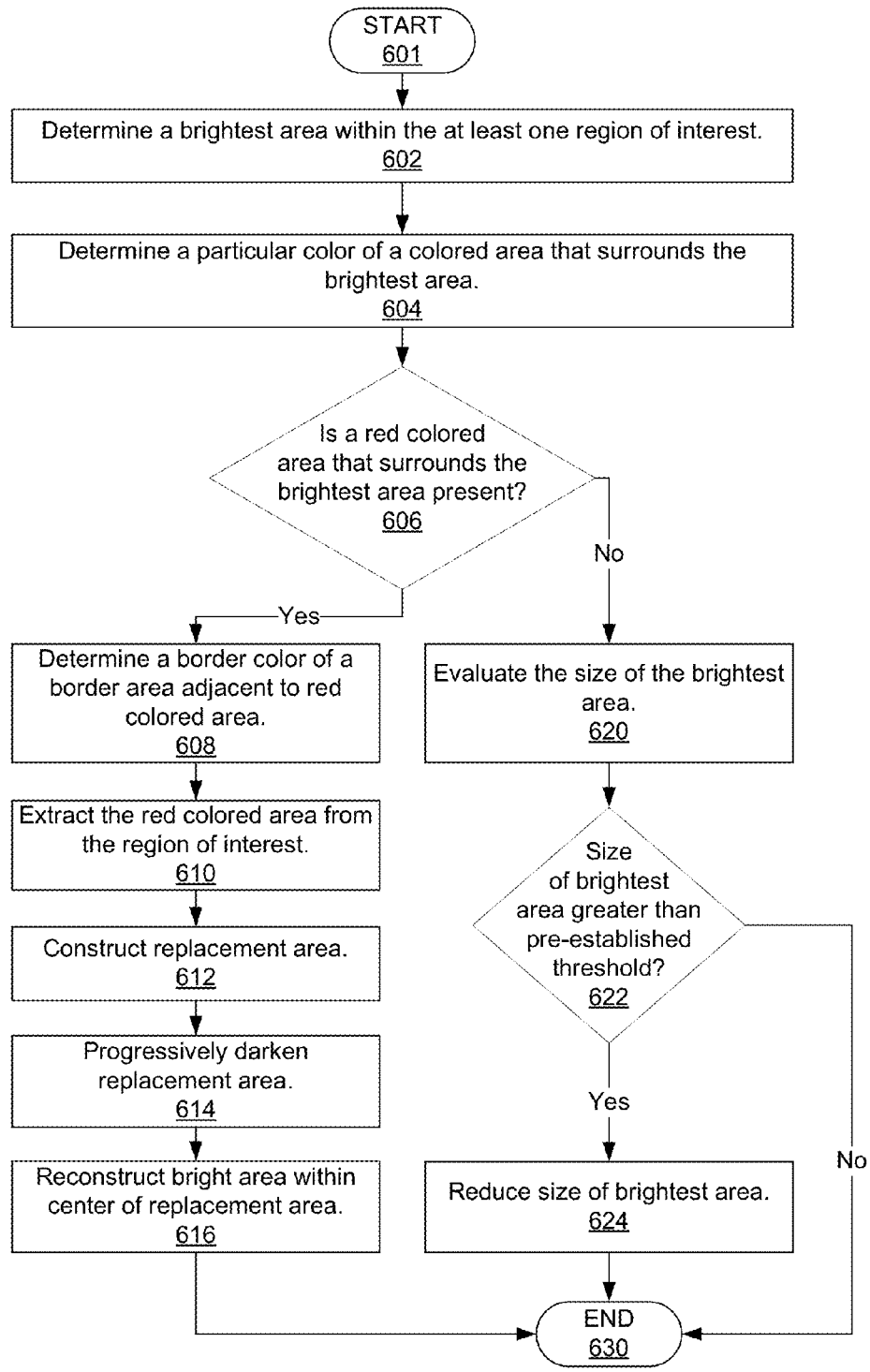
FIG. 6 is a flow chart illustrating a method for correcting red-eye and white/ghost-eye artifacts within at least one region of interest of an image data, in accordance with one or more embodiments.

Referring now to FIGS. 4-6, there are illustrated flow charts of various methods for correcting image artifacts within a captured image data, according to one or more embodiments. Aspects of the methods are described with reference to the components of FIGS. 1-3. Several of the processes of the methods provided in FIGS. 4-6 can be implemented by CPU 104 or CPU 204 executing software code of IPU 117 within a data processing system and/or mobile device, respectively. For simplicity, the methods described below are generally described as being performed by IPC 302.

Referring now to FIG. 4, there is depicted a high-level flow-chart illustrating a method for correcting image artifacts within at least one region of interest of an image data, in accordance with one or more embodiments of the present disclosure. Method 400 commences at initiator block 401 and proceeds to block 402 at which point image data and metadata corresponding to the image data are extracted from a buffer (e.g., buffer 310). At block 404, IPC 302 analyzes the metadata and identifies, from the metadata, a face in the image data and a position of a first eye and a second eye in the face. IPC 302 then selects at least one region of interest around at least one of the first eye and second eye of the face based on the size of the face and a distance between the first eye and second eye (block 406). For example, IPC 302, may identify a right eye of a face in the image data as a first region of interest. IPC 302 may further determine/measure the size of the face and identify a second eye that is within an expected distance away from the first eye based on the size of the face. IPC 302 may then determine, based on the size of the face and a measured distance between the first eye and the second eye, that the second eye is the left eye of the subject. IPC 302 may then identify the second eye as a second region of interest. In response to selecting the at least one region of interest, IPC 302 applies at least one correction to the at least one region of interest that corrects the appearance of an image artifact in the at least one region of interest (block 408). The method then terminates at block 420.

Referring now to FIG. 5, there is depicted a high-level flow-chart illustrating a method for correcting an iris color within at least one region of interest of an image data, in accordance with one or more embodiments of the present disclosure. Method 500 commences at initiator block 501. At block 502, IPC 302 determines a brightest area within at least one region of interest in the image data. At block 504, IPC 302 determines a particular color of a colored area that surrounds the brightest area in the at least one region of interest. The method continues to block 506 where IPC 302 replaces the brightest area within an iris area that is colored using the particular color. This color replacement within the iris area with the particular color represents a reconstruction of an iris of an eye within the at least one region of interest. IPC 302 then reconstructs a small bright area within the iris area that has a same brightness as a brightness of the brightest area (block 508). The small bright area represents a white dot or glint in the eye within the at least one region of interest, and that small bright area gives the eye a natural appearance when the corrected image data is viewed. The method then terminates at block 520.

Referring now to FIG. 6, there is depicted a high-level flow-chart illustrating a method for correcting red-eye and white/ghost-eye artifacts within at least one region of interest of an image data, in accordance with one or more embodiments of the present disclosure. Method 600 commences at initiator block 601. At block 602, IPC 302 determines a brightest area within at least one region of interest in an image data. At block 604, IPC 302 determines a particular color of a colored area that surrounds the brightest area in the at least one region of interest. At block 606, IPC 302 determines whether a red colored area surrounds the brightest area within the at least one region of interest. The red colored area, if present, represents an image artifact, such as a red-eye artifact.

In response to determining that a red colored area surrounds the brightest area in the at least one region of interest, IPC 302 determines a border color of a border area that is adjacent to the red colored area (block 608). At block 610, IPC 302 extracts the red colored area from the region of interest. In response to extracting the red colored area, IPC 302 reconstructs a replacement area that is colored using the border color to replace the red colored area in the region of interest (block 612). At block 614, IPC 302 progressively darkens the replacement area from an outside boundary of the replacement area towards the center of the replacement area. The method continues to block 616 where IPC 302 reconstructs a bright area within the center of the replacement area. The reconstructed bright area has a same brightness as a brightness of the brightest area. The reconstructed bright area represents a white dot or glint in the eye within the at least one region of interest, which gives the eye a natural appearance when the corrected image data is viewed. The method then terminates at block 630.

Returning to decision block 606, in response to determining that a red colored area that surrounds the brightest area in the at least one region of interest is not present, IPC 302 evaluates the size of the brightest area relative to a distance between a first eye and second eye in a face in the image data (block 620). At block 622, IPC 302 determines whether the size of the brightest area is greater than a pre-established size threshold that is associated with a distance between the first and second eyes, which indicates the presence of a white-eye/ghost-eye image artifact. In response to determining that the size of the brightest area is not greater than the pre-established size threshold, the method terminates at block 630. In response to determining the size of the brightest area is greater than the pre-established size threshold, IPC 302 reduces the size of the brightest area from an outside boundary towards the center of the brightest area (block 624). The reduction in the size is performed in order to give the brightest area the appearance of a natural glint in the eye when the image data is viewed by a user. The method then terminates at block 630.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    extracting image data and associated metadata from a buffer memory;
    determining, via the metadata, a face in the image data and a position of a first eye and a second eye of the face;
    measuring, in the image data, an eye distance between the first eye and the second eye;
    selecting at least one region of interest around at least one of the first and the second eye based on a size of the face and the eye distances; and
    in response to selecting the at least one region of interest, applying at least one correction to the at least one region of interest.

2. The method of claim 1, wherein applying the at least one correction to the at least one region of interest further comprises:
    determining a brightest area within the at least one region of interest; and
    determining a particular color within a colored area that surrounds the brightest area.

3. The method of claim 2, further comprising:
    replacing the brightest area within the at least one region of interest with an iris area that is colored using the particular color; and
    reconstructing a small bright area within the iris area, wherein the small bright area has a same brightness as a brightness of the brightest area.

4. The method of claim 2, further comprising:
    determining whether there is a red colored area that surrounds the brightest area within the at least one region of interest; and
    in response to determining the red colored area:
        determining a border area adjacent to the red colored area that is colored with a border color;
        extracting the red colored area from the at least one region of interest;
        constructing a replacement area that replaces the red colored area, wherein the replacement area is colored using the border color;
        progressively darkening the replacement area, wherein the replacement area is increasingly darkened from an outside boundary to a center of the replacement area; and
        reconstructing a small bright area within the center of the replacement area, wherein the small bright area has a same brightness as a brightness of the brightest area.

5. The method of claim 4, further comprising, in response to not determining a red colored area:
    evaluating a size of the brightest area relative to the eye distance;
    determining, based on the evaluation, whether the size of the brightest area is greater than a pre-established size threshold that is associated with the eye distance; and
    in response to determining that the size of the brightest area is greater than the pre-established size threshold, reducing the size of the brightest area from an outside boundary to a center of the brightest area.

6. The method of claim 1, wherein the at least one correction is applied before the image data is compressed into an image file format.

7. The method of claim 1, wherein the buffer memory is a zero shutter lag (ZSL) buffer memory associated with at least one camera sensor, and wherein the image data comprises color space data received from a color image pipeline associated with the at least one camera sensor.

8. A device comprising:
    a memory comprising a buffer memory;
    a processor that is coupled to the memory and which generates a plurality of processing modules comprising an image processing module that extracts image data and associated metadata from the buffer memory; and
    in response to extracting the image data and the associated metadata from the buffer memory:
        the processor determines, via the metadata, a face in the image data and a position of a first eye and a second eye of the face;
        the processor measures, in the image data, an eye distance between the first eye and the second eye;
        the processor selects at least one region of interest around at least one of the first and the second eyes based on a size of the face and the eye distance; and
        in response to selecting the at least one region of interest, the processor applies at least one correction to the at least one region of interest.

9. The device of claim 8, wherein in applying the at least one correction to the at least one region of interest:
    the processor determines a brightest area within the at least one region of interest; and
    the processor determines a particular color within a colored area that surrounds the brightest area.

10. The device of claim 9, wherein in response to the processor determining a particular color within a colored area that surrounds the brightest area:
    the processor replaces the brightest area within the at least one region of interest with an iris area that is colored using the particular color; and the processor reconstructs a small bright area within the iris area, wherein the small bright area has a same brightness as a brightness of the brightest area.

11. The device of claim 9, wherein:
the processor determines whether there is a red colored area that surrounds the brightest area within the at least one region of interest; and
in response to determining the red colored area:
the processor determines a border area adjacent to the red colored area that is colored with a border color;
the processor extracts the red colored area from the at least one region of interest;
the processor constructs a replacement area that replaces the red colored area, wherein the replacement area is colored using the border color;
the processor progressively darkens the replacement area, wherein the replacement area is increasingly darkened from an outside boundary to a center of the replacement area; and
the processor reconstructs a small bright area within the center of the replacement area, wherein the small bright area has a same brightness as a brightness of the brightest area.

12. The device of claim 11, wherein in response to not determining a red colored area:
the processor evaluates a size of the brightest area relative to the eye distance;
the processor determines, based on the evaluation, whether the size of the brightest area is greater than a pre-established size threshold that is associated with the eye distance; and
in response to determining that the size of the brightest area is greater than the pre-established size threshold, the processor reduces the size of the brightest area from an outside boundary to a center of the brightest area.

13. The device of claim 8, wherein the at least one correction is applied before the image data is compressed into an image file format.

14. The device of claim 8, wherein the buffer memory is a zero shutter lag (ZSL) buffer memory associated with at least one camera sensor, and wherein the image data comprises color space data received from a color image pipeline associated with the at least one camera sensor.

15. A computer program product comprising:
a computer readable storage device; and
program code on the computer readable storage device that when executed within a processor associated with a device, the program code enables the device to provide the functionality of:
extracting image data and associated metadata from a buffer memory;
determining, via the metadata, a face in the image data and a position of a first and a second eye of the face;
measuring, in the image data, an eye distance between the first and second eyes;
selecting at least one region of interest around at least one of the first and second eyes based on the size of the face and the eye distance; and
in response to selecting the at least one region of interest, applying at least one correction to the at least one region of interest.

16. The computer program product of claim 15, wherein applying the at least one correction to the at least one region of interest further comprises:
determining a brightest area within the at least one region of interest; and
determining a particular color within a colored area that surrounds the brightest area.

17. The computer program product of claim 16, the program code further comprising program code that enables the device to provide the functionality of:
replacing the brightest area within the at least one region of interest with an iris area that is colored using the particular color; and
reconstructing a small bright area within the iris area, wherein the small bright area has a same brightness as a brightness of the brightest area.

18. The computer program product of claim 16, the program code further comprising program code that enables the device to provide the functionality of:
determining whether there is a red colored area that surrounds the brightest area within the at least one region of interest; and
in response to determining the red colored area:
determining a border area adjacent to the red colored area that is colored with a border color;
extracting the red colored area from the at least one region of interest;
constructing a replacement area that replaces the red colored area, wherein the replacement area is colored using the border color;
progressively darkening the replacement area, wherein the replacement area is increasingly darkened from an outside boundary to a center of the replacement area; and
reconstructing a small bright area within the center of the replacement area, wherein the small bright area has a same brightness as a brightness of the brightest area.

19. The computer program product of claim 17, the program code further comprising program code that enables the device to provide the functionality of:
evaluating a size of the brightest area relative to the eye distance;
determining, based on the evaluation, whether the size of the brightest area is greater than a pre-established size threshold that is associated with the eye distance; and
in response to determining that the size of the brightest area is greater than the pre-established size threshold, reducing the size of the brightest area from an outside boundary to a center of the brightest area.

20. The computer program product of claim 15, wherein the buffer memory is a zero shutter lag (ZSL) buffer memory associated with at least one camera sensor, and wherein the image data comprises color space data received from a color image pipeline associated with the at least one camera sensor.

* * * * *